UNITED STATES PATENT OFFICE.

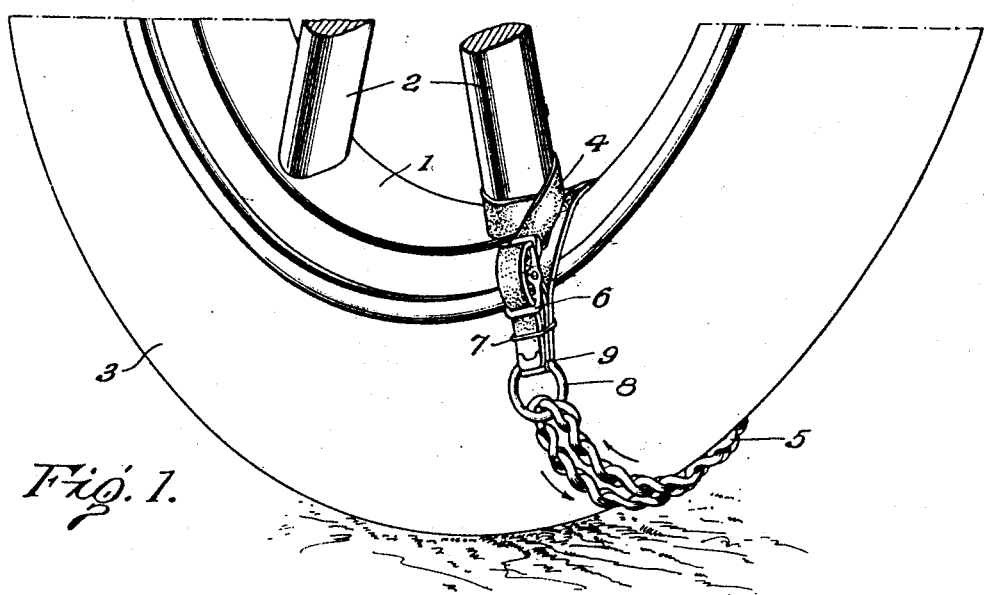
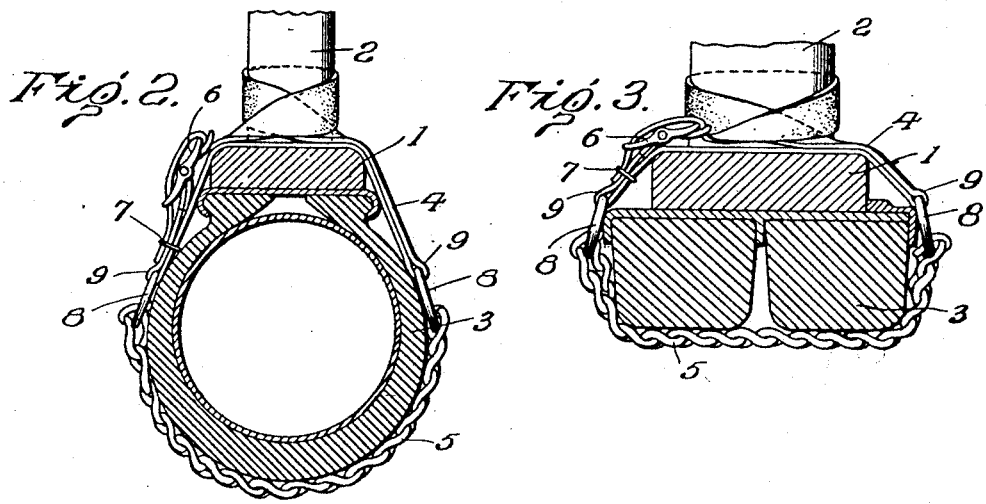
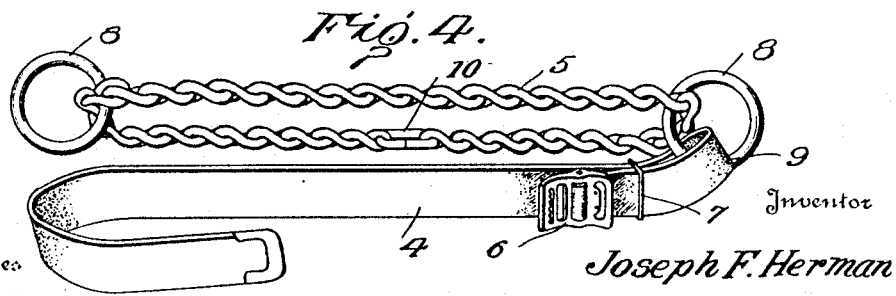

JOSEPH F. HERMAN, OF WASHINGTON, DISTRICT OF COLUMBIA, ASSIGNOR TO BERNADETTE M. HERMAN.

ANTISKIDDING CHAIN FOR WHEELS.

1,315,366. Specification of Letters Patent. Patented Sept. 9, 1919.

Application filed December 14, 1915. Serial No. 66,811.

*To all whom it may concern:*

Be it known that I, JOSEPH F. HERMAN, a citizen of the United States, residing at Washington, in the District of Columbia, have invented certain new and useful improvements in Antiskidding Chains for Wheels, of which the following is a specification.

The present invention relates to antiskidding chains for wheels of automobiles and trucks and consists in the combinations and arrangements of parts hereinafter described and particularly set forth in the accompanying claims.

The invention has for its purpose to provide an anti-skidding chain of single length which is arranged and carried by the wheel in a manner providing a double chain length for active use on the tire tread, thereby obtaining the maximum efficiency or working area from the single chain on the wheel.

The invention has for its further purpose to provide a double working chain at the tread of the tire which will have positive engagement with the surface passed over, but which is so attached to the wheel that the respective chain lengths are allowed to creep transversely of the tire, thereby subjecting the contacting surfaces of the tire tread and chain to uniform wearing throughout.

The invention further contemplates the employment of means for readily attaching the device to the wheel of any automobile or truck, and which may be quickly removed and conveniently stored for carrying.

The anti-skidding chain is shown by way of illustration in the accompanying drawings, wherein:

Figure 1 illustrates the application of the invention to a wheel,

Fig. 2 is a transverse sectional view of a wheel rim and tire showing the manner of applying the chain, Fig. 3 is a similar view showing the device fitted to a dual tire, and Fig. 4 is a detail perspective view of the article *per se.*

Referring to the construction in detail and with like characters designating corresponding parts in the different views shown, 1 indicates the rim, 2 the spokes, and 3 the tire of any automobile wheel.

The anti-skidding device comprises a strap 4 doubled upon itself, as clearly shown in Figs. 2 and 3, and having one length thereof wrapped around a spoke 2 to position the chain 5 with respect to circumference of the wheel. Said strap is fitted with an ordinary buckle 6, and a ring 7 holds the free strap end.

The chain 5 passes through a pair of rings 8 that are held by the strap loops 9, and the respective chain ends are connected by a link 10 of substantially the same length as the links in the chain. The "double" chain is securely held to the periphery of the tire after the manner shown in Figs. 2 and 4, and since the chain holding strap is itself held to a spoke of the wheel, the chain is prevented from bodily traveling circumferentially of the tire.

The two rings 8 are of sufficiently large diameters to allow the endless chain 5 to easily slip therethrough and creep transversely of the tire tread, actuated by the travel of the wheel. The chain 5 is preferably of the twisted link type, since this allows the chain to freely pass through the rings and avoids the likelihood of the chain becoming caught in the rings, or otherwise formed to interfere with the creeping movement.

In the arrangement shown in Fig. 3 the construction of chain and its means and manner of attachment are the same as disclosed above, but here, however, the application is to a dual tire. And in this connection it may be stated that the device as herein disclosed is applicable to automobile wheels generally.

It has been found from actual use over a considerable period of time, that the chain 5 travels or "creeps" through the rings 8 precisely after the manner of a belt riding on pulleys, (as shown by the arrows in Fig. 1) and by reason of this movement, the chain and that portion of the tire in contact therewith are subjected to uniform wearing throughout their respective engaging surfaces. The tire is therefore not liable to become injured through continual contact with a mutilated chain link which would otherwise be the case were the chain not free to move continuously on the tire. There is also the further advantage that with having the double chain lengths in engagement with the ground, an increased gripping action is obtained for the wheel over that derived with the usually employed single chain.

The device as a whole is immovable transversely of the tread of the wheel and likewise cannot move circumferentially thereof. The chain 5, however, may travel continuously transversely of the tire in one path. These functions of the device are attributable to securing the movable chain part (5) to the pair of slip rings 8 that are connected to the strap 4 which is in turn made fast to a spoke of the wheel. These advantages would not accrue if the strap 4 were otherwise mounted on the wheel; e. g. between the spokes thereof.

It is obvious that those skilled in the art may vary the details of construction and arrangement of parts without departing from the spirit of the invention, and therefore I do not wish to be limited to such features except as may be required by the claims.

Having thus fully described my said invention, what I claim as new and desire to secure by Letters Patent, is:

1. An individual anti-skid chain for vehicle wheels comprising a device adapted to be secured to a spoke of the wheel and having chain-engaging portions narrow in cross section to enable the lengths of another chain looped therein to lie with their sides contiguous, and a chain carried by said device having its respective ends connected to form an endless loop passing through said engaging portions and with the lengths of said chain loop lying side by side in contiguous relationship and adapted to creep through said engaging portions and transversely of the tire tread actuated by the travel of the wheel, substantially as set forth.

2. An anti-skidding means for wheels comprising a device adapted to be secured to a spoke of the wheel, a pair of rings carried by said device providing chain engaging members, and a twisted chain carried by said device having its respective ends connected forming an endless chain with lengths lying side by side and passing through said pair of rings, said pair of rings constructed to give sufficient clearance to allow the chain to creep therethrough transversely of the tire tread actuated by the travel of the wheel, substantially as set forth.

3. An anti-skidding device for wheels comprising a member adapted to be wrapped about a spoke of the wheel, a pair of rings connected to said member and disposed on either side of the wheel tire, and a chain passing loosely through said rings and having its respective ends connected forming an endless chain, said rings being of sufficient diameter to give clearance to allow the chain to creep therethrough transversely of the tire tread actuated by the travel of the wheel, substantially as set forth.

In testimony whereof I affix my signature.

JOSEPH F. HERMAN.

Copies of this patent may be obtained for five cents each, by addressing the "Commissioner of Patents Washington, D. C."